United States Patent
Chen et al.

(10) Patent No.: US 9,661,646 B2
(45) Date of Patent: *May 23, 2017

(54) TECHNIQUES TO TRAIN A PERSONAL AREA NETWORK COMPONENT

(71) Applicant: Intel Corporation, Santa Clara, CA (US)

(72) Inventors: Sherry S. Chen, Portland, OR (US); Marta Martinez Tarradell, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,387

(22) Filed: Jul. 6, 2015

(65) Prior Publication Data

US 2016/0165618 A1 Jun. 9, 2016

Related U.S. Application Data

(63) Continuation of application No. 13/997,222, filed as application No. PCT/US2011/053677 on Jun. 22, 2013, now Pat. No. 9,078,271.

(51) Int. Cl.
| | |
|---|---|
| H04J 3/00 | (2006.01) |
| H04W 72/08 | (2009.01) |
| H04W 72/12 | (2009.01) |
| H04W 4/00 | (2009.01) |
| H04W 72/04 | (2009.01) |
| H04W 28/26 | (2009.01) |

(52) U.S. Cl.
CPC ......... *H04W 72/085* (2013.01); *H04W 4/008* (2013.01); *H04W 72/0446* (2013.01); *H04W 72/1215* (2013.01); *H04W 72/1231* (2013.01); *H04W 28/26* (2013.01)

(58) Field of Classification Search
None
See application file for complete search history.

(56) References Cited

U.S. PATENT DOCUMENTS

| | | | |
|---|---|---|---|
| 2004/0259589 A1 | 12/2004 | Bahl et al. | |
| 2005/0097409 A1* | 5/2005 | Shin | H04W 52/12 714/704 |
| 2006/0292986 A1* | 12/2006 | Bitran | H04W 16/14 455/41.2 |

(Continued)

FOREIGN PATENT DOCUMENTS

| | | |
|---|---|---|
| CN | 1901394 A | 1/2007 |
| CN | 1630294 B | 7/2010 |

*Primary Examiner* — Otis L Thompson, Jr.

(57) ABSTRACT

Techniques to train a personal area network component may include obtaining a packet error rate from a personal area network component. It may be determined that the packet error rate is greater than a packet error rate threshold after a time period. A reservation may be requested from a wide area network component based a first transmit pattern from the personal area network component. A second or adjusted transmit pattern from the wide area network component may be received. Personal area network signals may be transmitted based on the second transmit pattern. The time period may be adjusted based on a personal area network packet error rate of the second transmit pattern. Other embodiments are described and claimed.

18 Claims, 8 Drawing Sheets

(56) References Cited

U.S. PATENT DOCUMENTS

| | | | | |
|---|---|---|---|---|
| 2007/0135162 A1* | 6/2007 | Banerjea | H04W 76/026 | 455/556.1 |
| 2007/0232358 A1* | 10/2007 | Sherman | H04B 1/3805 | 455/560 |
| 2008/0233875 A1* | 9/2008 | Desai | H04W 16/14 | 455/41.2 |
| 2008/0247367 A1* | 10/2008 | Guo | H04W 72/1215 | 370/338 |
| 2009/0005111 A1* | 1/2009 | Wang | H04W 16/14 | 455/553.1 |
| 2009/0054009 A1* | 2/2009 | Yang | H04W 16/14 | 455/78 |
| 2009/0061849 A1* | 3/2009 | Yang | H04W 74/0816 | 455/426.1 |
| 2009/0080401 A1* | 3/2009 | Zhu | H04W 72/1215 | 370/343 |
| 2009/0129367 A1* | 5/2009 | Bitran | H04W 72/1257 | 370/350 |
| 2009/0137206 A1* | 5/2009 | Sherman | H04W 16/14 | 455/41.2 |
| 2009/0197639 A1* | 8/2009 | Khairmode | H04W 88/06 | 455/553.1 |
| 2009/0219904 A1* | 9/2009 | Khairmode | H04W 88/06 | 370/338 |
| 2010/0265856 A1* | 10/2010 | Yang | H04B 1/525 | 370/281 |
| 2011/0243046 A1* | 10/2011 | Huang | H04W 72/1215 | 370/311 |
| 2011/0243047 A1* | 10/2011 | Dayal | H04W 16/14 | 370/311 |
| 2011/0256834 A1* | 10/2011 | Dayal | H04W 16/14 | 455/67.7 |
| 2012/0033645 A1* | 2/2012 | Mantravadi | H04W 72/1215 | 370/336 |
| 2012/0060158 A1* | 3/2012 | Kadous | H04W 72/1215 | 718/100 |
| 2012/0069766 A1* | 3/2012 | Fu | H04B 1/406 | 370/252 |
| 2012/0188907 A1* | 7/2012 | Dayal | H04W 72/1215 | 370/254 |
| 2012/0213116 A1* | 8/2012 | Koo | H04B 1/1027 | 370/253 |
| 2012/0243473 A1* | 9/2012 | Kadous | H04W 72/1215 | 370/328 |
| 2012/0314598 A1* | 12/2012 | Sadek | H04W 16/14 | 370/252 |
| 2012/0329515 A1* | 12/2012 | Husted | H04W 52/226 | 455/552.1 |
| 2013/0058314 A1* | 3/2013 | Broise | H04W 72/1215 | 370/336 |
| 2013/0070653 A1* | 3/2013 | Banister | H04W 56/0015 | 370/281 |
| 2013/0208711 A1* | 8/2013 | Van Lieshout | H04B 1/406 | 370/336 |
| 2013/0343236 A1* | 12/2013 | Chen | H04W 88/06 | 370/278 |

* cited by examiner

```
┌─────────────────────────────────────────────┐
│  DETERMINE A PACKET ERROR RATE FROM A PERSONAL │
│  AREA NETWORK COMPONENT IS GREATER THAN A PACKET │
│    ERROR RATE THRESHOLD AFTER A TIME PERIOD    │
│                      502                       │
└─────────────────────────────────────────────┘
                        │
┌─────────────────────────────────────────────┐
│  OBTAIN A FIRST TRANSMIT PATTERN FROM THE PERSONAL │
│            AREA NETWORK COMPONENT              │
│                      504                       │
└─────────────────────────────────────────────┘
                        │
┌─────────────────────────────────────────────┐
│  REQUEST A RESERVATION FROM A WIDE AREA NETWORK │
│   COMPONENT BASED ON THE FIRST TRANSMIT PATTERN │
│                      506                       │
└─────────────────────────────────────────────┘
                        │
┌─────────────────────────────────────────────┐
│         RECEIVE A SECOND TRANSMIT PATTERN      │
│           FROM THE WIDE AREA COMPONENT         │
│                      508                       │
└─────────────────────────────────────────────┘
                        │
┌─────────────────────────────────────────────┐
│      TRANSMIT PERSONAL AREA NETWORK SIGNALS    │
│      BASED ON THE SECOND TRANSMIT PATTERN      │
│                      510                       │
└─────────────────────────────────────────────┘
```

DETERMINE WHEN A TIME PERIOD ELASPES
602

RECEIVE A TRIGGER EVENT FROM THE WIDE AREA NETWORK COMPONENT AFTER THE WIDE AREA NETWORK COMPONENT CHANGES DATA ALLOCATION
604

ADJUST THE TIME PERIOD BASED ON A PACKET ERROR RATE THRESHOLD
606

WHEN THE PACKET ERROR RATE IS GREATER THAN THE PACKET ERROR RATE THRESHOLD, RETRAIN THE PERSONAL AREA NETWORK COMPONENT USING THE TECHNIQUES DESCRIBED IN FIG. 3.
608

TECHNIQUES TO TRAIN A PERSONAL AREA NETWORK COMPONENT

CROSS-REFERENCE TO RELATED APPLICATIONS

This application is a continuation of, claims the benefit of and priority to previously filed U.S. patent application Ser. No. 13/997,222 filed Jun. 22, 2013, entitled "TECHNIQUES TO TRAIN A PERSONAL AREA NETWORK COMPONENT", the subject matter of which is incorporated herein by reference in its entirety.

BACKGROUND

Devices such as, smart phones, laptops, tablets and/or netbooks communicate wirelessly using various technologies. The various communication technologies may be used simultaneously. For example, a cell phone may use both Bluetooth technology and 4G technology, such as, long term evolution (LTE) radios.

The various forms of communication technology often interfere with one another. This is especially true when two different forms of communication technology, such as Bluetooth and 4G technology, are collocated on a device. The interference between Bluetooth and 4G technology is often a result of the frequency bands used by each type of communication technology. For example, since 4G technology may include a 2.3 GHz and/or a 2.5 GHz frequency band and Bluetooth may include a 2.4 GHz industrial, scientific and medical (ISM) frequency band, Bluetooth reception may collide with 4G transmissions. These collisions typically result in a loss of Bluetooth packets which disrupts the quality of a Bluetooth signal. Additionally, Bluetooth transmissions may desensitize 4G radio reception.

Current solutions use wire signaling by real-time monitoring and messaging between wireless modules. As the resources use real-time tracking and handshaking, the number of wires and types of signals are fixed resulting in an inflexible and resource-heavy solution. It is with respect to these and other considerations that the present improvements have been needed.

DETAILED DESCRIPTION

Various embodiments are directed to techniques to train a personal area network (PAN) component. Some embodiments are particularly directed to techniques to train a PAN component to mitigate interference between PAN transmissions and/or receptions and wide area network (WAN) receptions and/or transmissions, respectively, in a device with PAN and WAN components. When a packet error rate of the PAN transmissions exceeds a threshold, the PAN component may transmit an adjusted pattern depending on preferences from the WAN component. In an embodiment, a PAN component may include a Bluetooth component and a WAN component may include a 4G component.

In an embodiment, for example, an apparatus may comprise a processing component and an interference reduction component. In an embodiment, the interference reduction component may be operative on the processing component. The interference reduction component may include a PAN component and a WAN component. A PAN component may obtain a first transmit pattern and may request a reservation from a WAN component based on the first transmit pattern. The WAN component may receive the reservation request, determine a second transmit pattern based on preferences of the WAN component, and send the second transmit pattern to the PAN component. In an embodiment, the second transmit pattern may include one or more slots reserved for PAN transmission. The PAN component may receive the second transmit pattern from the WAN component and transmit PAN packets based on the second transmit pattern.

As the PAN component may be trained to adapt to an adjusted transmit pattern, the PAN component does not rely on a re-transmit window to re-transmit lost packets. Instead, the PAN component may transmit each packet according to an adjusted transmit pattern. Since there is no real time monitoring, signaling, tracking or wires, computing power and resources are saved. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
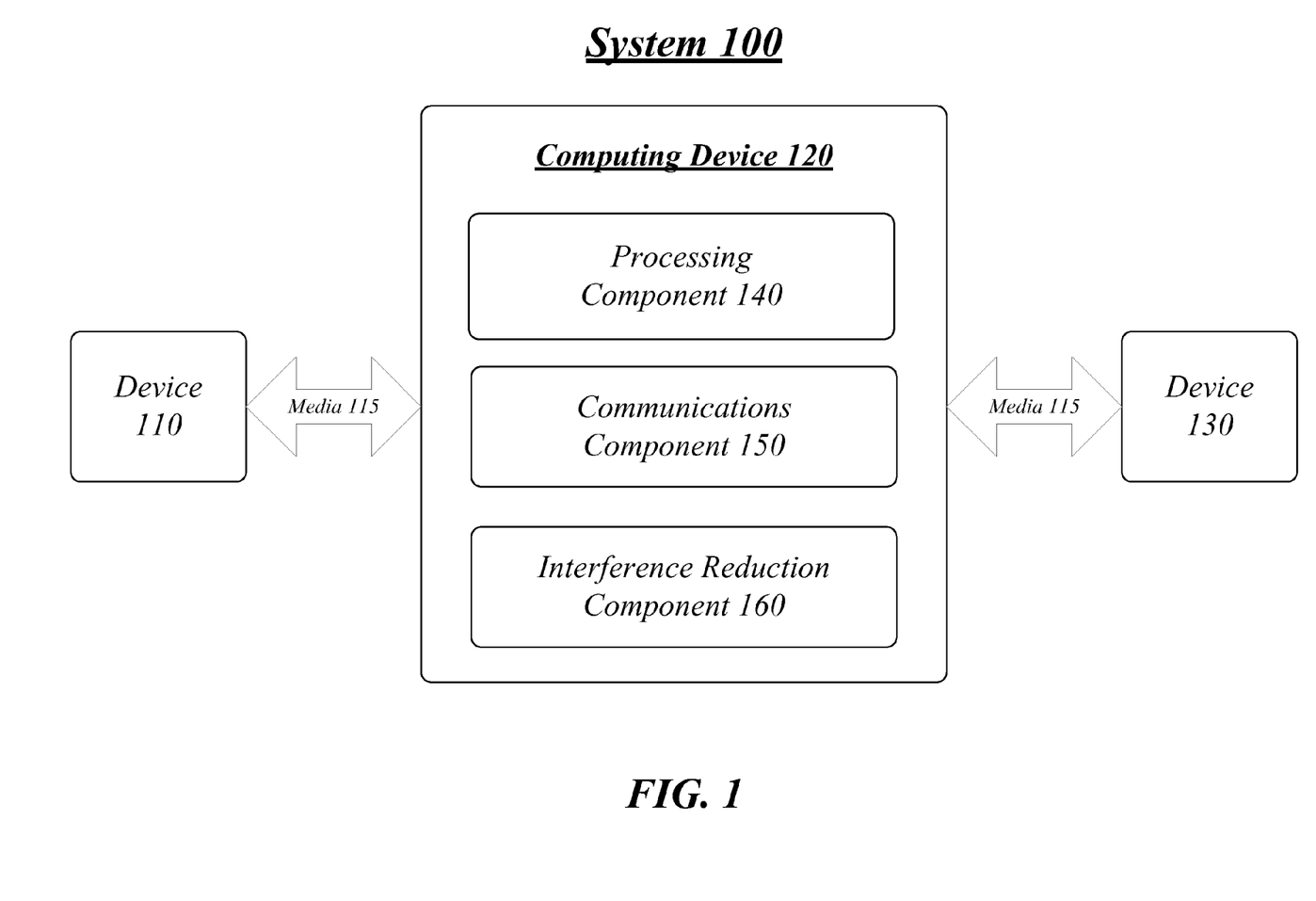
FIG. 1 illustrates an embodiment of a system to reduce interference.

FIG. 1 illustrates a block diagram of an interference reduction system 100. In one embodiment, the system 100 may comprise a communications system 100. Although the system 100 shown in FIG. 1 has a limited number of elements in a certain topology, it may be appreciated that the system 100 may include more or less elements in alternate topologies as desired for a given implementation.

In various embodiments, the communications system 100 may comprise, or form part of a wireless communications system, or a combination of a wireless communications system with a wired communications system. For example, the communications system 100 may include one or more devices arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more devices arranged to communicate information over one or more types of wireless communication links, such as wireless shared media 150. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands. In the latter case, the wireless devices may include one more wireless interfaces and/or components for wireless communication, such as one or more transmitters, receivers, transmitter/receivers ("transceivers"), radios, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

The communications system 100 may communicate information in accordance with one or more standards as promulgated by a standards organization. In various embodiments, the communications system 100 may comprise or be implemented as a mobile broadband communications system. Examples of mobile broadband communications systems include, without limitation, systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. In one embodiment, for example, the communications system 100 may be implemented in accordance with 3GPP Long Term Evolution (LTE) standard, the Worldwide Interoperability for Microwave Access (WiMAX) or WiMAX II standard. WiMAX is a wireless broadband technology based on the IEEE 802.16 standard of which IEEE 802.16-2004 and the 802.16e amendment (802.16e-2005) are Physical (PHY) layer specifications. WiMAX II is an advanced Fourth Generation (4G) system based on the IEEE 802.16j and IEEE 802.16m proposed standards for International Mobile Telecommunications (IMT) Advanced 4G series of standards. The embodiments are not limited in this context.

The communications system 100 may communicate, manage, or process information in accordance with one or more protocols. A protocol may comprise a set of predefined rules or instructions for managing communication among devices. In various embodiments, for example, the communications system 100 may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

The communication system 100 may have one or more devices 110, 120, 130. A device 110, 120, 130 generally may comprise any physical or logical entity for communicating information in communications system 100. A device 110, 120, 130 may be implemented as hardware, software, or any combination thereof, as desired for a given set of design parameters or performance constraints. Although FIG. 1 may show a limited number of devices and components by way of example, it can be appreciated that more or less devices may be employed for a given implementation.

In an embodiment, a device 110, 120, 130 may be a computer-implemented system having one or more software applications and/or components. For example, a device 110, 120, 130 may comprise, or be implemented as, a computer system, a computing device, a computer sub-system, a computer, an appliance, a workstation, a terminal, a server, a personal computer (PC), a laptop, an ultra-laptop, a handheld computer, a personal digital assistant (PDA), a smart phone, a tablet computer, a gaming device, a set top box (STB), a television, a digital television, a telephone, a mobile telephone, a cellular telephone, a handset, a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a graphics processor, an application processor, a digital signal processor (DSP) and/or a network processor, an interface, an input/output (I/O) device (e.g., keyboard, mouse, a display, a liquid crystal display (LCD), a touch screen display, printer, speakers), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In an embodiment, a device 110, 120, 130 may comprise, or be implemented as, software, a software module, an application, a program, a subroutine, an instruction set, computing code, words, values, symbols or combination thereof. A device 110, 120, 130 may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, micro-code for a network processor, and so forth. The embodiments are not limited in this context.

A device 110, 120, 130 may be a computing device 120. A computing device 120 may execute processing operations or logic for the system 100 using a processing component 140. In an embodiment, the processing component may be a processor executed by the personal area network and/or the wide area network. The processing component 140 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 120 may communicate with other devices, such as, but not limited to, device 110, 130, over a communications media 115 using communications signals via the communications component 150. By way of example, and not limitation, communications media 115 includes other wireless communications media. Examples of wireless communications media 115 may include acoustic, radio-frequency (RF) spectrum, infrared and other wireless media.

The devices 110, 120, 130 of communications system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a device to process the media information in a certain manner. The media and control information may be communicated from and to a number of different devices or networks. The control information may include an adapted personal area network transmit pattern.

The device 120 may execute communications operations or logic using communications component 150. The communications component 150 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 150 may include various types of standard communication elements, such as one or more communications interfaces, network interfaces, network interface cards (NIC), radios, wireless transmitters/receivers (transceivers), wired and/or wireless communication media, physical connectors, and so forth.

The communications components 150 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, compiled and/or interpreted programming language, such as C, C++, C#, Java, BASIC, Perl, Matlab, Pascal, Visual BASIC, assembly language, machine code, and so forth. The embodiments are not limited in this context. When communications component 140 is implemented as software, the software may be executed by any suitable processor and memory unit.

The computing device 120 may include an interference reduction component 160. The interference reduction component 160 may be used to mitigate interference. The interference reduction component 160 may include a personal area network (PAN) component and a wide area network (WAN) component. The PAN component may be trained to adapt to an adjusted transmit pattern in order to reduce interference between packets sent from the PAN component and packets sent from the WAN component.

Figure 2:
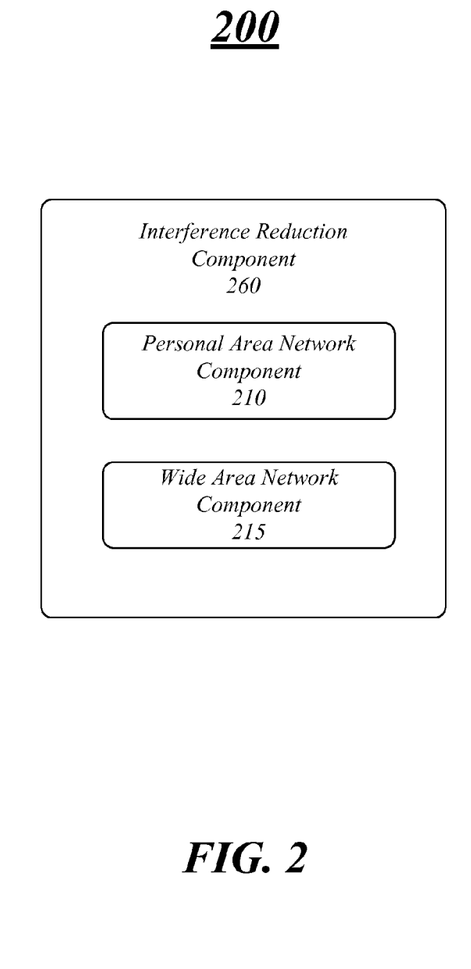
FIG. 2 illustrates an embodiment of an interference reduction component.

FIG. 2 illustrates an embodiment of an interference reduction component. In an embodiment, the interference reduction component 260 may include a first radio component and a second radio component. In an embodiment, the interference reduction component 260 may include a personal area network (PAN) component 210 and a wide area network (WAN) component 215. The interference reduction component 260 may mitigate interference between PAN traffic and WAN traffic. The PAN component 210 and the WAN component 215 may communicate to obtain a PAN transmit pattern which reduces interference between PAN and WAN transmissions and/or receptions.

In an embodiment, the personal area network (PAN) component 210 may transmit PAN packets. In an embodiment, the PAN component 210 may include wireless network technologies, such as, but not limited to, Bluetooth, Infrared Data Association, ZigBee, Z-Wave and Wireless Universal Serial Bus (USB). The PAN wireless network technologies are not limited to these examples.

A PAN component 210 may communicate with nearby devices and/or with devices further away through the Internet. For example, the PAN component 210 may be a Bluetooth component. The Bluetooth component may transmit Bluetooth packets on an Extended Synchronous Connection Oriented (eSCO) link. In an embodiment, eSCO packets may include voice data. The Bluetooth component may include a master/slave relationship to transmit eSCO packets at specific time slots. The Bluetooth component may adhere to a Bluetooth standard which specifies several transmit eSCO packet intervals for a single or multiple slot eSCO packet. For example, the transmit eSCO ($T_{eSCO}$) packet intervals for a single slot eSCO packet may be, but are not limited to, 6, 8, 10, 12, 14 16 and 18 slots. In an embodiment, the Bluetooth standard may specify a re-transmit window for the eSCO packets. The re-transmit window may be used when the prior transmitted packet fails. The re-transmit window for eSCO packets may be, but is not limited to, 0, 2 and 4. In an embodiment, alternate type of packets may be used, such as, but not limited to, packets sent over on an Asynchronous Connectionless Link (ACL).

In an embodiment, the wide area network (WAN) component 215 may communicate with devices over a broad range of geographic regions. The WAN component 215 may transmit 4G packets. The WAN component 215 may include, but is not limited to, 4G radio, either Time-Division Duplex (TDD), Frequency-division duplexing (FDD), a hybrid of TDD and FDD; and it can be 3GPP Long-Term Evolution (LTE), or Worldwide Interoperability for Microwave Access (WiMAX).

In an embodiment, when PAN transmissions and WAN transmissions run freely, the PAN transmissions and/or receptions may interfere with the WAN receptions and/or transmissions, respectively. In an embodiment, a WAN transmission may collide with a PAN reception, and the PAN packets may be lost. Accordingly, a PAN transmit pattern may be obtained and adjusted or adapted based on the WAN component. In an embodiment, a PAN transmission can desensitize WAN reception, and increase the packet error rate of WAN. The adapted PAN transmission pattern may decrease the error rate caused by the interference which may improve the overall performance of PAN and WAN traffic.

Figure 3:
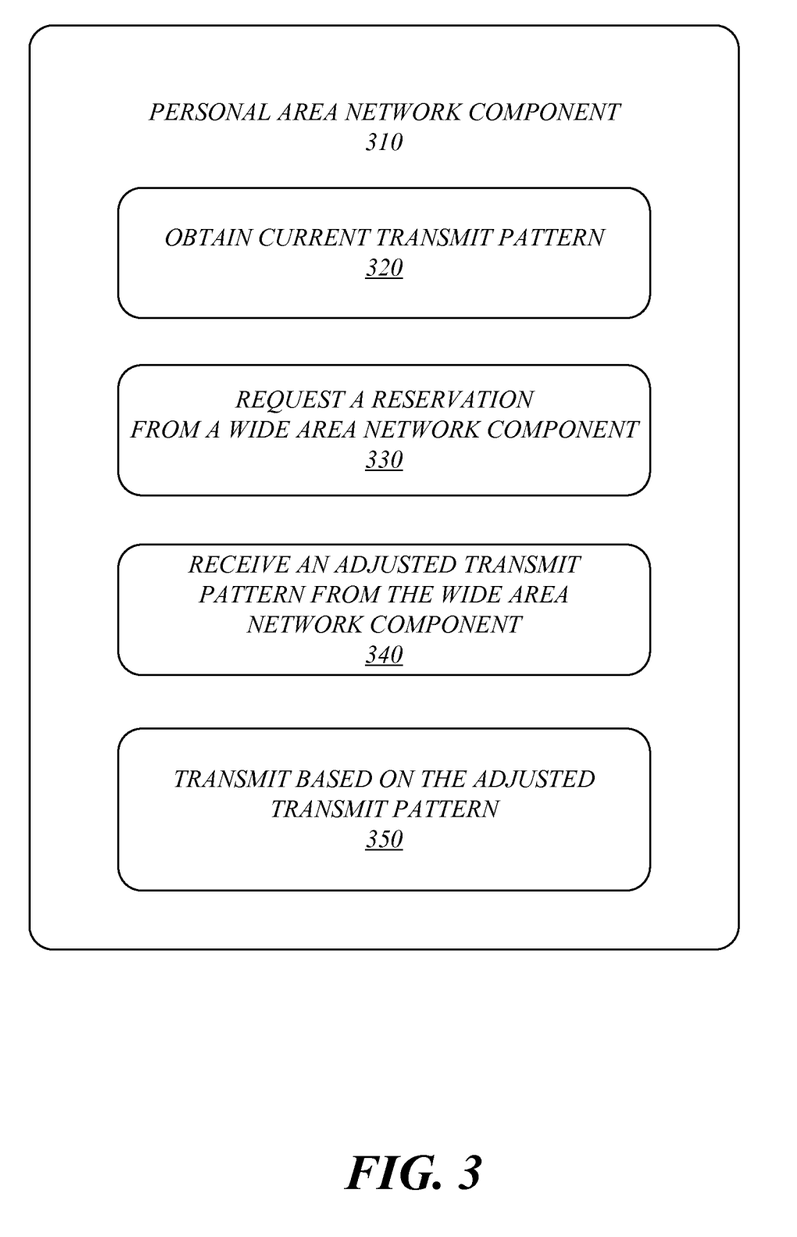
FIG. 3 illustrates an embodiment of a personal area network component.

FIG. 3 illustrates an embodiment of a PAN component. In an embodiment, the PAN component 310 may be a Bluetooth component. A Bluetooth component may be trained and/or retrained to transmit a Bluetooth transmit pattern which avoids interference with a WAN component, such as, but not limited to, a 4G component.

In order to train and/or retrain the PAN component 310, a current transmit pattern of PAN packets may be obtained 320. In an embodiment, a current transmit pattern of PAN packets may be obtained 320 by recording the PAN's transmission pattern while both PAN and WAN traffic is free running. For example, if the PAN component is a Bluetooth component, the Bluetooth component may have a pattern which repeats every eight eSCO packets. For example, the Bluetooth transmit pattern for eSCO packets may be (0, 2, 4, −1, 0, 2, 4 −1) repeated every eight Bluetooth packets. A Bluetooth component may detect that the packets are transmitted in an eight packet transmit cycle or an eight packet pattern. In an embodiment, the PAN component with various LTE TDD frame configurations may have a two-packet cycle, a four packet cycle, or other multiple of eight, as eight is the common multiple of 1, 2, 4, and 8. In an embodiment, PAN component 310 may determine how often to be retrained and may select a Packet Error Rate (PER) threshold that meets a Quality of Service (QoS) requirement.

In an embodiment, each number within the pattern may represent a time slot or slot position within an interval period ($T_{eSCO}$) to transmit a packet. In an embodiment, the transmit pattern may represent eight periods or intervals which may be equal to eight Bluetooth packets. In an embodiment, the transmit pattern may have more or less periods. When a transmission fails, a packet may be retransmitted at a next retransmit opportunity within the period. For example, as discussed above, the retransmit window may include slots 0, 2 and 4 according to Bluetooth protocol.

For example, a Bluetooth component may have a current transmit pattern with eight periods may be (4, −1, 0, 2, 4, −1, 0, 2). The "4" may represent that a first packet was successfully transmitted at the fifth slot during the first period. The "−1" may represent that this packet has used all re-transmit opportunities and the packet was lost. The "0" may represent that a third packet was transmitted at the first slot in the third period. The "2" may represent that a fourth packet was transmitted at the third slot in the fourth period.

As further discussed below, at the "−1" slots where a packet was repeatedly lost, the PAN component may request 330 that the WAN component yield to PAN traffic during one or more specific periods. In an embodiment, the PAN component may request a persistent reservation based on a current transmit pattern from the PAN component.

The PAN component may receive 340 an adjusted transmit pattern from the WAN component. For example, based on the current transmit pattern discussed above, the Bluetooth component was unable to transmit during the $2^{nd}$ and $6^{th}$ packets. The Bluetooth component may send the current transmit pattern to a 4G component. As the $2^{nd}$ Bluetooth packet is "4", the 4G component, may decide to give the Bluetooth component the opportunity to transmit either in time slot 0, 2, or 4, based on what time slot is best for the 4G's traffic allocation. In an embodiment, the 4G component may send the Bluetooth component an adjusted transmit pattern, such as (4, 2, 0, 2, 4, 0, 0, 2). Based on this information, a 4G component chose to reserve a third slot in the $2^{nd}$ period and a first slot in the $6^{th}$ period so that the Bluetooth component may successfully transmit a packet during these periods without interference from the WAN. The embodiments are not limited to this example.

The PAN component may transmit 350 based on the adjusted transmit pattern. For example, referring to the above patterns, the Bluetooth component may adapt the adjusted transmit pattern, (4, 2, 0, 2, 4, 0, 0, 2), and may transmit each Bluetooth packet accordingly. For example, the first Bluetooth packet may be transmitted at slot 5. The second Bluetooth packet may be transmitted at slot 3. The third Bluetooth packet may be transmitted at slot 1. The fourth Bluetooth packet may be transmitted at slot 3, etc. As discussed above, the Bluetooth component does not rely on re-transmission to recover the lost packets.

Figure 4:
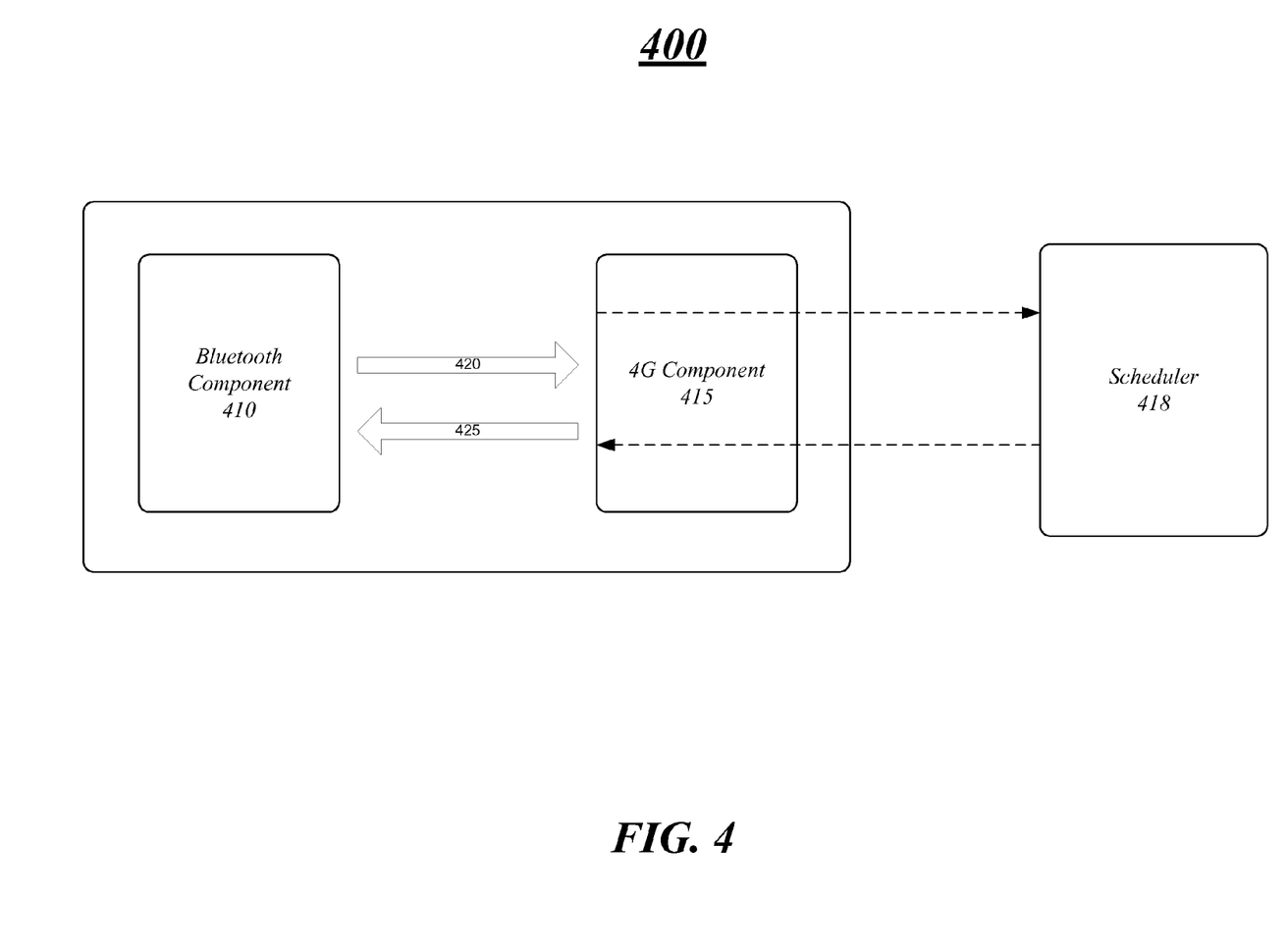
FIG. 4 illustrates an embodiment of the communication exchanged between a Bluetooth component and a 4G component.

FIG. 4 illustrates an embodiment of the communication exchanged between a Bluetooth component 410 and a 4G component 415. In an embodiment, a Bluetooth component 410 may send a reservation request 420 to a 4G component 415. In an embodiment, the reservation request 420 may ask the 4G component to determine a time slot at which the 4G component 415 will yield to Bluetooth traffic.

For example, a Bluetooth component 410 may have been unable to successfully transmit a Bluetooth packet during the $3^{rd}$ and $5^{th}$ periods. As a result, the Bluetooth component 410 may request a reservation of a slot during the $3^{rd}$ and $5^{th}$ periods so that the Bluetooth component 410 may successfully transmit during these periods.

In an embodiment, the reservation request 420 may include a first transmit pattern of the Bluetooth component 410. For example, the first transmit pattern may indicate that the Bluetooth component 410 was unable to successfully transmit Bluetooth signals during the $3^{rd}$ and $5^{th}$ periods. In an embodiment, the $3^{rd}$ and $5^{th}$ periods may be represented by −1 as no Bluetooth transmissions were successful during those periods. In an embodiment, −1 may represent that the packet was lost. The other periods may be represented by the slot number in which the transmissions were successful. For example, a number 0 in the first period may represent that the Bluetooth component 410 successfully transmitted a Bluetooth signal during the first slot in the first period. For example, a number 4 in the second period may represent that the Bluetooth component 410 successfully transmitted a Bluetooth signal at the fifth slot in the second period. For example, the Bluetooth transmit pattern may be (0, 4, −1, 2, −1, 2, 0, 4).

In an embodiment, the 4G component 415 may receive the Bluetooth transmission request. In an embodiment, the 4G component may communicate with a scheduler 418. A scheduler 418 may be in charge of scheduling 4G traffic. For example, for WiMAX, the 4G scheduler may be located on a base station. For example, for LTE, the scheduler 418 may be on an eNodeB. In an embodiment, the 4G component 415 may relay the information from the Bluetooth transmission request to the scheduler 418. The scheduler 418 may select one or more time slots for a Bluetooth transmission based on the 4G component's preference. In an embodiment, the scheduler 418 may review the 4G transmit patterns and the amount of traffic expected during a particular period. The scheduler 418 may select one or more time slots for a Bluetooth transmission based on the 4G component's availability or anticipated availability. The scheduler 418 may relay the selected time slots for a Bluetooth transmission to the 4G component 415.

In an embodiment, the 4G component 415 may send a response 425 with selected time slots for Bluetooth transmission to the Bluetooth component 415. In an embodiment, the response 425 may include a second or adjusted transmit pattern. In an embodiment, the response 425 with the second transmit pattern may include one or more slots where the 4G scheduler 418 reserved time for a Bluetooth transmission, and the 4G component 415 may relay the reservation response to the Bluetooth component 410. For example, based on the 4G component's 415 preferences, the scheduler 418 may select a time slot for Bluetooth transmission. In an embodiment, the scheduler 418 may select a time slot for each period in which the Bluetooth component was unable to successfully transmit a signal. For example, the scheduler 418 may determine a slot in the $3^{rd}$ period and a slot in the $5^{th}$ period in which it will allow the Bluetooth component to transmit a Bluetooth packet. In an embodiment, the 4G component 415 may not send and/or receive 4G data during the one or more reserved time slots. In an embodiment, the 4G component 415 may still transmit a signal in the reserved slot since a Bluetooth slot duration is only 0.625 milliseconds while a 4G slot duration is 5 or 10 milliseconds. In an embodiment, the 4G component 415 may send the adjusted or second transmit pattern to the Bluetooth component. For example, the second transmit pattern may be (0, 4, 2, 2, 0, 2, 0, 4).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
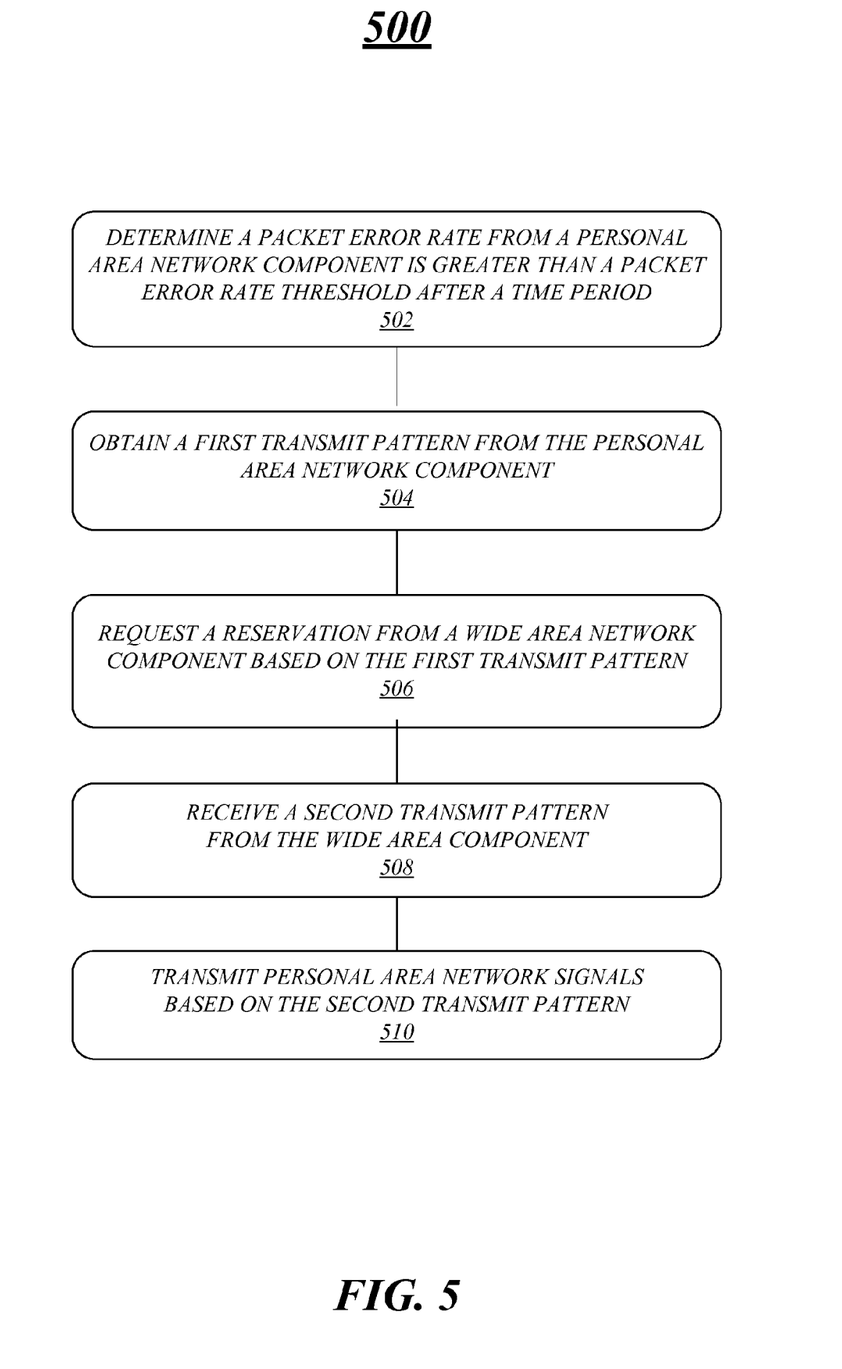
FIG. 5 illustrates an embodiment of a logic flow to train a personal area network component.

FIG. 5 illustrates an embodiment of a logic flow 500 for training a personal area network (PAN) component. In an embodiment, the PAN component may be a Bluetooth component. The logic flow 500 may be representative of some or all of the operations executed by one or more embodiments described herein.

In the illustrated embodiment shown in FIG. 5, the logic flow 500 may determine that a packet error rate from a PAN component is greater than a packet error rate threshold after a time period at block 502. In an embodiment, a packet error rate threshold may be determined. In an embodiment, the packet error rate threshold may be the packet error rate from a PAN component that is needed to meet its Quality of Service (QoS) requirement. In an embodiment, the packet error rate threshold may be set to an industry standard packet error rate threshold. In an embodiment, the packet error rate threshold may be set by a vendor. In an embodiment, the packet error rate may depend on the type of packets such as, but not limited to, talk, picture, data, music and/or video. In an embodiment, the packet error rate threshold may be set to meet a connection requirement. In an embodiment, the packet error rate threshold may be between 0 and 1, where 1 may represent that 100% of all the packets are decoded successfully and 0 may represent that 0% of the packets are successfully decoded.

In an embodiment, during a time period, a PAN component and a wide area network (WAN) component may transmit freely. The PAN component and the WAN component may transmit freely as there may be no coordination between the two components.

In an embodiment, as a result of the PAN component and the WAN component transmitting freely, packets sent by the PAN component and the WAN component may collide and/or create interference. In an embodiment, PAN transmissions may desensitize WAN component reception. In an embodiment, PAN transmissions and/or receptions and WAN receptions and/or transmissions are especially likely to interfere and/or collide as both the transmissions and/or receptions are from and/or to the same device. In an embodiment, the PAN component may experience packet loss when a WAN transmission is sent from a device at approximately the same time.

In an embodiment, the PAN component and the WAN component may transmit freely until a time period has ended. In an embodiment, a time period may be determined. In an embodiment, a time period may be used for periodically training and retraining the PAN transmit pattern. In an embodiment, a time period may be determined by Equation 1 below:

$$T=8*N, N=1,2,3, \qquad \text{Equation 1}$$

In an embodiment, a time period may be represented by T. In an embodiment, N may be an integer greater than 0. In an embodiment, the time period may be equal to eight times an integer.

In an embodiment, after a time period, it may be determined whether the packet error rate is higher than the packer error rate threshold. In an embodiment, it may be determined that the PAN transmission has a packet error rate greater than a packet error rate threshold.

The logic flow 500 may obtain a first transmit pattern from the PAN component at block 504. In an embodiment, the PAN component may monitor the transmission of PAN packets and may obtain a first transmit pattern. In an embodiment, the PAN component may have a packet transmit cycle as the transmission slots may repeat after a certain number of packets have been sent. In an embodiment, the PAN component may be a Bluetooth component with an eight packet transmit cycle. For example, the first transmit pattern may be obtained by recording the first eight packets sent from the Bluetooth component. The embodiments are not limited to this example. In an embodiment, each packet to be transmitted within the pattern may be represented in a transmit pattern as a slot number within the period. In an embodiment, the transmit pattern for the PAN component may have eight periods. In an embodiment, the transmit pattern may have more or less periods.

For example, the first transmit pattern may be from a Bluetooth component. The first transmit pattern may be (0, 2, 4, −1, 0, 2, 4, −1). Similar to the transmit patterns discussed above, the "−1" may represent that the packet transmission was unsuccessful. The "0" may represent that a packet was transmitted at the first slot. The "2" may represent that a packet was transmitted at the third slot.

The logic flow 500 may request a reservation from a WAN component based on the first transmit pattern at block 506. In an embodiment, the WAN component may be a 4G component. For example, when the packet error rate is higher than the packet error rate threshold, a new transmit pattern may be obtained by recording the first eight packets. If one of those packets is lost ("−1") for this new pattern, a reservation may be requested by the PAN component to the WAN component. In an embodiment, the PAN component may ask the WAN component to yield to PAN traffic. In an embodiment, the PAN component may request a persistent reservation based on the first transmit pattern.

In an embodiment, the WAN component may receive the PAN transmission request. The WAN component may forward the request to the scheduler, and the scheduler may select one or more time slots for a PAN transmission based on the WAN component's preference. For example, the scheduler may determine that it can reserve a certain slot for PAN transmission. As discussed above, the scheduler, may review the WAN component's own transmit patterns and the amount of traffic expected during a particular period in which the PAN component was unable to transmit. The scheduler select one or more time slots for a PAN transmission based on the WAN component's availability or anticipated availability. In an embodiment, the scheduler may modify the first transmit pattern based on the time reserved by the WAN component.

For example, based on the first transmit pattern, the Bluetooth component was unable to transmit a Bluetooth packet during the $4^{th}$ and $8^{th}$ periods. The Bluetooth component may ask the WAN component to reserve a slot in the $4^{th}$ period and a slot in the $8^{th}$ period so that the Bluetooth may successfully transmit a packet during that period. The WAN component may be a 4G component. Through the scheduler, a 4G component may determine a slot may be reserved during the $4^{th}$ and $8^{th}$ periods in order to allow the Bluetooth component to successfully transmit a Bluetooth signal. In an embodiment, the 4G component, through the scheduler, may have reserved a slot based on how busy the 4G component was or expected to be during that that period. For example, the 4G component may have reserved a third slot (slot 2) in the $4^{th}$ and $8^{th}$ periods. The embodiments are not limited to this example.

The logic flow 500 may receive a second transmit pattern from the WAN component at block 508. For example, a second transmit pattern may be received from the WAN component. The second transmit pattern may include one or more slots that are reserved for PAN transmission. In an embodiment, the one or more slots reserved for PAN transmission may occur in one or more periods in the second transmit pattern. The embodiments are not limited to this example.

Based on the WAN component's preference, the WAN component may select a time slot. For example, the WAN component may be a 4G component and the PAN component may be a Bluetooth component. Based on the 4G component's presences, the 4G component, through a scheduler, may select a time slot for Bluetooth transmission and a modified transmit pattern may be received by the Bluetooth component. For example, the second or modified transmit pattern may be (0, 2, 4, 2, 0, 2, 4, 2).

The logic flow 500 may transmit PAN signals based on the second transmit pattern at block 510. For example, a second transmit pattern may be received from the WAN component where one or more slots in one or more periods are reserved for PAN transmission.

For example, the PAN component may be a Bluetooth component and the second transmit pattern may be (0, 2, 4, 2, 0, 2, 4, 2). Accordingly, the Bluetooth component may adapt the second transmit pattern and may transmit each packet accordingly. For example, the first Bluetooth packet may be transmitted at the first slot (slot 0). The second Bluetooth packet may be transmitted at the third slot (slot 2). The third Bluetooth packet may be transmitted at the fifth slot (slot 4). The fourth Bluetooth packet may be transmitted at slot third (slot 2), etc.

Figure 6:
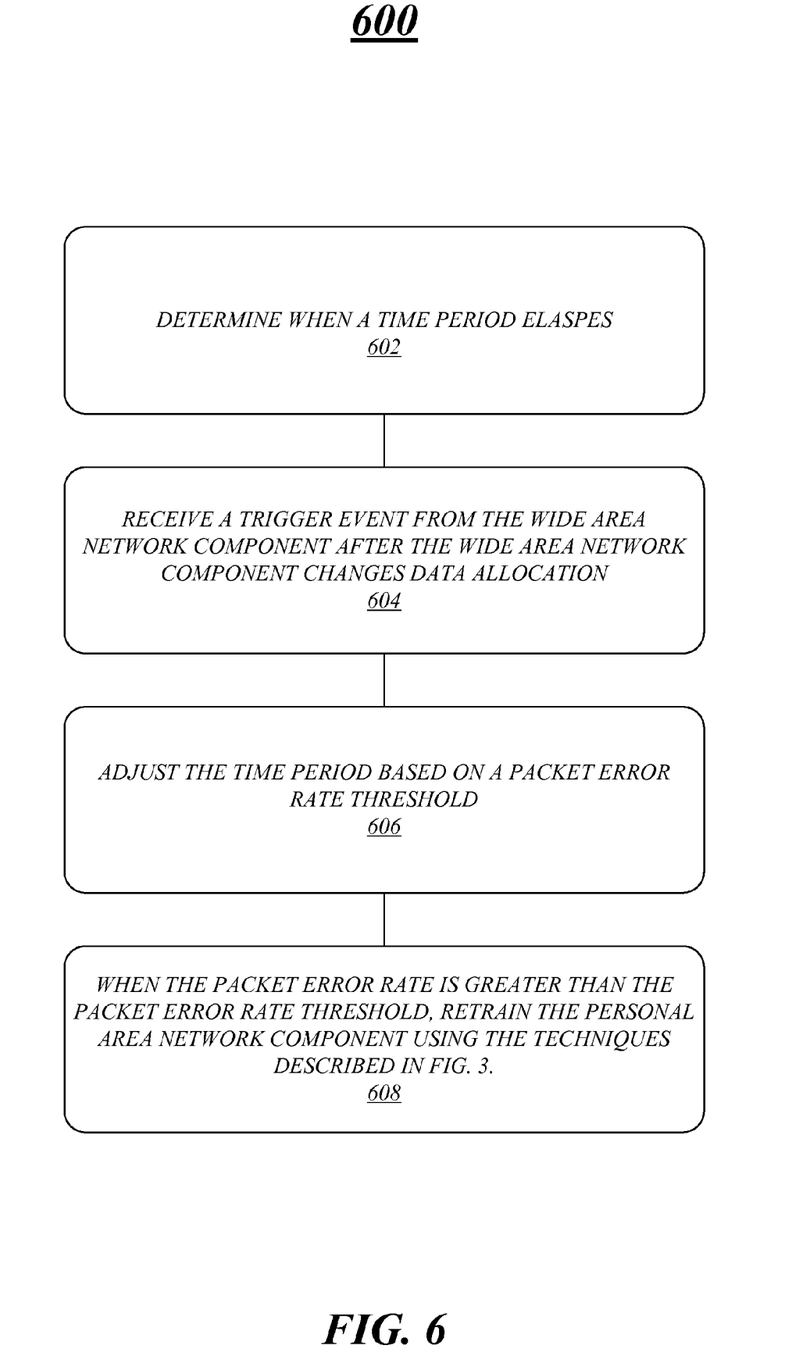
FIG. 6 illustrates an embodiment of a logic flow to retrain a personal area network component.

FIG. 6 illustrates an embodiment of a logic flow 600 for retraining the PAN component. The logic flow 600 may be representative of some or all of the operations executed by one or more embodiments described herein. In an embodiment, the logic flow 600 may be used to adjust the PAN transmit pattern.

In the illustrated embodiment shown in FIG. 6, the logic flow 600. In an embodiment, the logic flow 600 may determine when a time period elapses at block 604. In an embodiment, the PAN component may transmit according to the second transmit pattern until a time period elapses. For example, the PAN component may be a Bluetooth component which transmits according to the second transmit pattern until a time period elapses. In an embodiment, a time period elapses when the amount of time that passes is greater than the time period. In an embodiment, the time period may by 8 times an integer as shown in Equation 1 above. In an embodiment, the time period may be the time period used in FIG. 5, block 502.

The logic flow 600 may receive a trigger event from the WAN component after the WAN component changes data allocation at block 604. The trigger event may notify the PAN component that the WAN component has changed data allocation. In an embodiment, a trigger event may occur when a WAN component recognizes that the WAN data allocation has changed. The WAN component may recognize that the data is allocated in different moments of time. For example, the data may be allocated for different sub frames in LTE. For example, the data may be allocated for different zones in WiMAX.

The logic flow 600 may adjust the time period based on a packet error rate at block 606. For example, the time period may be adjusted based on a packet error rate (PER). The time period may be adjusted according to Equations 2 and 3 below:

$$\text{If PER<PER Threshold, then } T=T+8*K, K=1,2,3 \qquad \text{Equation 2}$$

$$\text{If PER>PER Threshold, then } T=T-8*K, K=1,2,3 \qquad \text{Equation 3}$$

If the packet error rate is less than a packet error rate threshold, then the time period may be increased since the PAN component may be retrained less often. The new time period may be set to the old time period plus 8 times an integer greater than zero. In an embodiment, the time period may be increased when the packet error rate is below the packet error rate threshold as the transmit pattern is successful. Accordingly, the PAN transmission does not need to be adjusted and/or checked as often.

If the packet error rate is greater than a packet error rate threshold, then the time period may be decreased since the PAN component may be retrained more often. The new time period may be set to the old time period minus 8 times an integer greater than zero. When the packet error rate is higher than the packet error rate threshold, the transmit pattern is not successful and the PAN component may need to be trained more frequently. When the packet error rate is higher than the packet error rate threshold, the PAN transmit pattern may need to be adjusted more frequently.

The logic flow 600 may retrain the PAN component when the packet error rate is greater than the packet error rate threshold at block 608. The PAN component may be retrained using the techniques described in FIG. 3. In an embodiment, the PAN component may be retrained by obtaining the current transmit pattern, requesting a reservation from the WAN component, receiving an adjusted transmit pattern from the WAN component and transmitting based on the adjusted transmit pattern.

Figure 7:
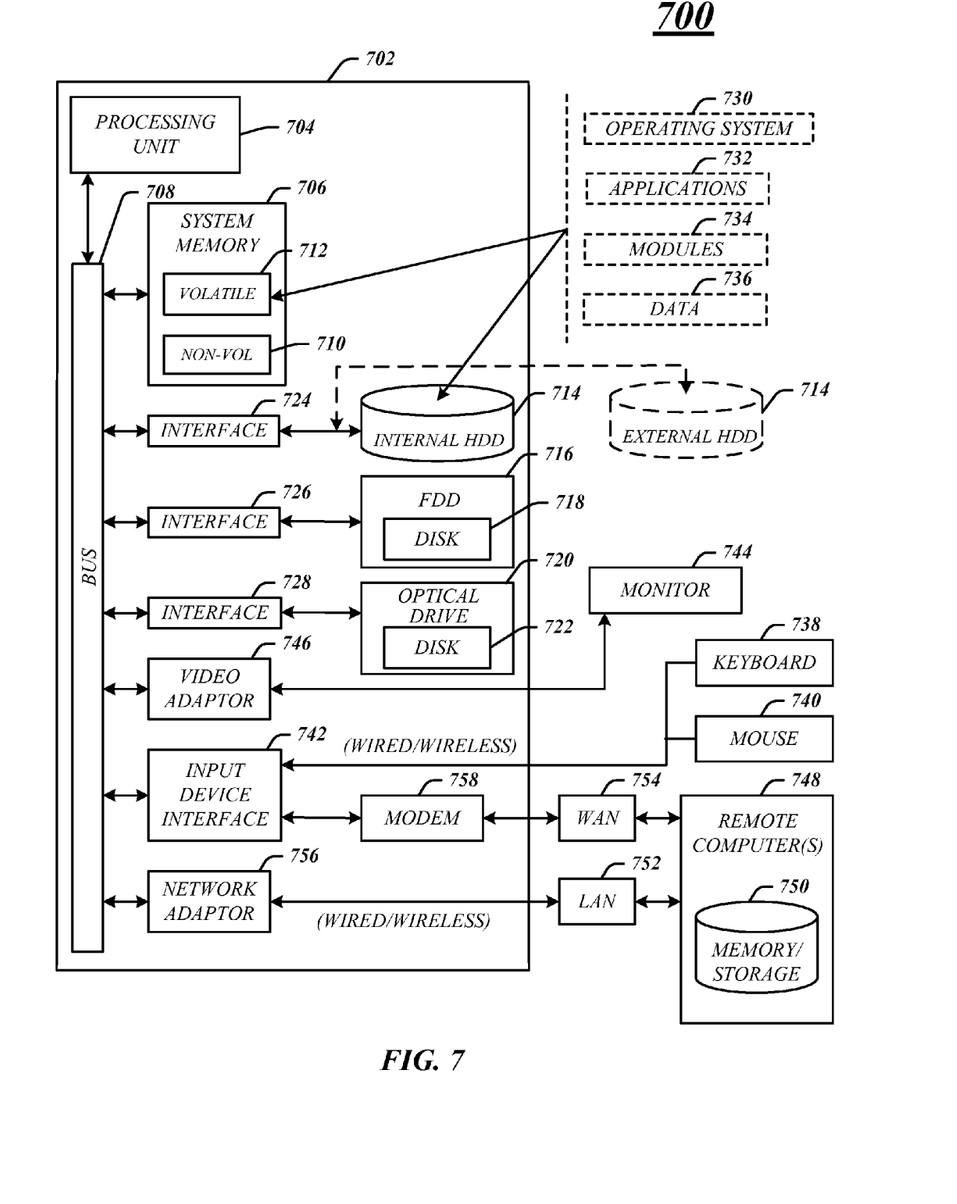
FIG. 7 illustrates an embodiment of a computing architecture.

FIG. 7 illustrates an embodiment of an exemplary computing architecture 700 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 700 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

The one or more application programs 732, other program modules 734, and program data 736 can include, for example, the interference reduction component 260, the personal area network (PAN) component 210 and the wide area network (WAN) component 215.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, a touch screen display, or the like.

These and other input devices are often connected to the processing unit 704 through an input device interface 742 that is coupled to the system bus 708, but can be connected by other interfaces such as a parallel port, IEEE 1394 serial port, a game port, a USB port, an IR interface, a non-volatile memory port and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), Worldwide Interoperability for Microwave Access (WiMAX), 3GPP LTE, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
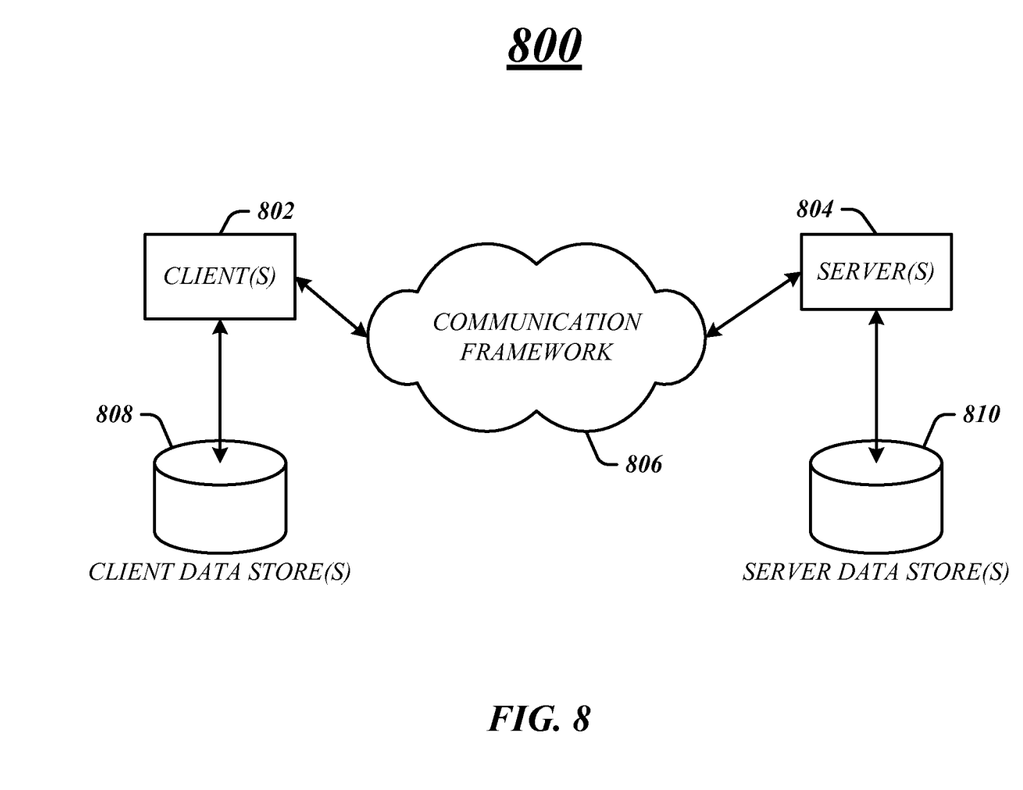
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client systems 310, 400. The servers 804 may implement the server system 330. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols, such as those described with reference to systems 300, 400 and 700. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An article comprising a storage medium containing instructions that when executed enable a system to:
   select a packet error rate threshold for a personal area network component to meet a quality of service (QoS) requirement of the personal area network component;
   determine whether a packet error rate from the personal area network component is greater than the packet error rate threshold after a time period; and
   in response to a determination that the packet error rate is greater than the packet error rate threshold:
      request a reservation from a wide area network component based on a first transmit pattern from the personal area network component;
      receive a second transmit pattern from the wide area network component;
      transmit personal area network signals based on the second transmit pattern; and
      adjust the time period based on a packet error rate of the second transmit pattern.

2. The article of claim 1, comprising instructions that when executed enable the system to:
   request a slot from the wide area network component in one or more periods where personal area network packets were lost.

3. The article of claim 1, comprising instructions that when executed enable the system to:
   receive the second transmit pattern where one or more slots are reserved for personal area network transmission.

4. The article of claim 1, comprising instructions that when executed enable the system to:
   configure the time period, the time period comprises eight times an integer.

5. The article of claim 1, comprising instructions that when executed enable the system to:
   record a time slot for a successful personal area network packet transmission in the first transmit pattern.

6. The article of claim 1, comprising instructions that when executed enable the system to:
   increase the time period when the packet error rate of the second pattern is greater than a packet error rate threshold.

7. The article of claim 1, comprising instructions that when executed enable the system to:
   decrease the time period when the packet error rate of the second pattern is less than a packet error rate threshold.

8. The article of claim 1, comprising instructions that when executed enable the system to:
   receive a trigger event from the wide area network component.

9. A method, comprising:
   selecting a packet error rate threshold for a personal area network component to meet a quality of service (QoS) requirement of the personal area network component;
   determining whether a packet error rate from the personal area network component is greater than the packet error rate threshold after a time period; and
   in response to a determination that the packet error rate is greater than the packet error rate threshold:
      obtaining a first transmit pattern from the personal area network component;
      requesting a reservation from a wide area network component based on the first transmit pattern;
      receiving a second transmit pattern from the wide area network component where one or more time slots are reserved for personal area network transmission; and
      transmitting personal area network signals based on the second transmit pattern.

10. The method of claim 9, comprising:
    requesting a slot in one or more periods where personal area network packets were lost.

11. The method of claim 9, the personal area network component comprising a Bluetooth component and the wide area network component comprising a 4G component.

12. The method of claim 9, comprising:
    recording a time slot for a successful personal area network packet transmission in the first transmit pattern.

13. The method of claim 9, comprising:
    recording a negative one for a time slot in the first transmit pattern when a personal area network packet transmission is lost.

14. The method claim 9, comprising:
    adjusting the time period based on a packet error rate of the second transmit pattern.

15. The method of claim 14, comprising:
    increasing the time period when the packet error rate is greater than a packet error rate threshold; and
    decreasing the time period when the packet error rate is less than a packet error rate threshold.

16. An apparatus, comprising:
    a processing component; and
    a wireless communication component operative on the processing component, the wireless communication component comprising:
       a personal area network component operative to:
          select a personal area network packet error rate threshold to meet a quality of service (QoS) requirement;
          determine whether a packet error rate of personal area network communications is greater than the personal area network packet error rate threshold after a time period; and
          in response to a determination that the packet error rate is greater than the personal area network packet error rate threshold:
             request a reservation from a wide area network component based on a first transmit pattern,
             receive a second transmit pattern from the wide area network component, the second transmit pattern to include one or more slots reserved for personal area network transmission, and
             transmit personal area network signals based on the second transmit pattern.

17. The apparatus of claim 16, the wireless communication component further comprising:
    the wide area network component operative to:
       receive the reservation request from the personal area network component, and send a second transmit pattern to the personal area network component based on preferences of the wide area network component.

18. The apparatus of claim 16, comprising:
a touch screen display.

\* \* \* \* \*